Jan. 24, 1956 L. E. THOMAS 2,732,012

TIME CONTROL FOR TELEPHONE CIRCUITS

Filed Aug. 24, 1953 3 Sheets-Sheet 1

Loy E. Thomas
INVENTOR.

BY Clarence A. O'Brien and Harvey B. Jacobson
Attorneys

Jan. 24, 1956 L. E. THOMAS 2,732,012

TIME CONTROL FOR TELEPHONE CIRCUITS

Filed Aug. 24, 1953 3 Sheets-Sheet 2

Loy E. Thomas
INVENTOR.

BY Clarence A. O'Brien
and Harvey B. Jacobson
Attorneys

Jan. 24, 1956 L. E. THOMAS 2,732,012

TIME CONTROL FOR TELEPHONE CIRCUITS

Filed Aug. 24, 1953 3 Sheets-Sheet 3

Loy E. Thomas
INVENTOR.

BY Clarence A. O'Brien
and Harvey B. Jacobson
Attorneys

United States Patent Office 2,732,012

Patented Jan. 24, 1956

2,732,012

TIME CONTROL FOR TELEPHONE CIRCUITS

Loy E. Thomas, Knightsville, Ind.

Application August 24, 1953, Serial No. 375,925

2 Claims. (Cl. 161—1)

This invention relates in general to improvements in time control mechanisms, and more specifically to a time controller for telephone circuits.

In many parts of the country the demand for telephones is such that only party lines are obtainable. Inasmuch as there are a number of subscribers on a single party line, in the event one of the subscribers should talk for a long period of time it would tie up all of the other subscribers on that line and they would be unable to either receive or make telephone calls. It is therefore the primary object of this invention to provide an improved time control mechanism for telephone circuits which will control the time which an individual's telephone may be utilized.

Another object of this invention is to provide an improved time controller for telephone circuits which will automatically open a telephone circuit at a predetermined time and then close such circuit after another predetermined interval.

Another object of this invention is to provide an improved time control mechanism for telephone circuits which may be conveniently and quickly attached in existing telephone circuits.

A further object of this invention is to provide an improved time control mechanism for telephone circuits which is entirely automatic in operation and which is actuated in response to the removal of a hand set from its associated hook.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2:
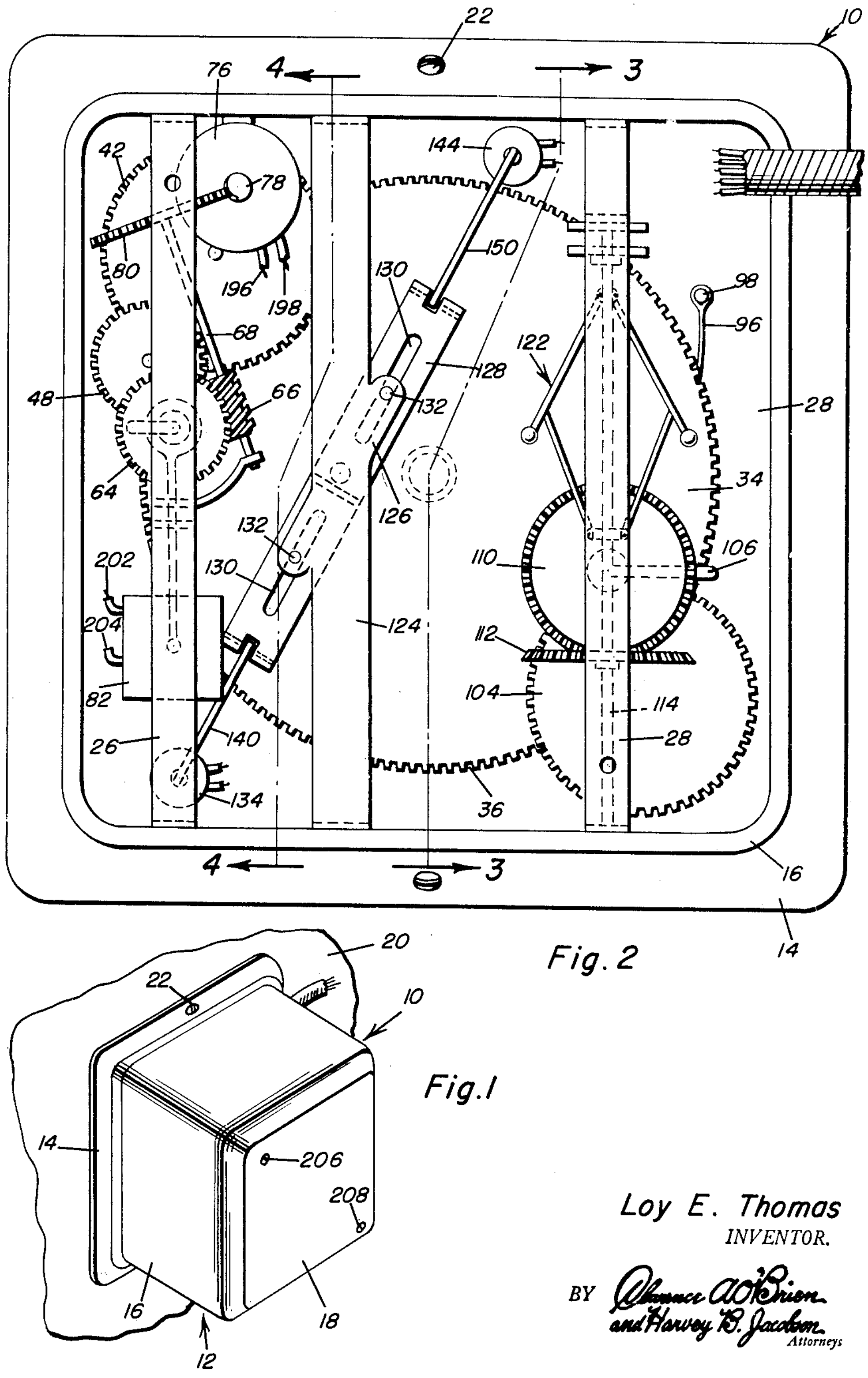
Figure 1 is a perspective view of the time control mechanism which is the subject of this invention and shows the same attached to a side of the house.
Figure 2 is an enlarged elevational view showing the time control mechanism of Figure 1 with the cover thereof removed in order to clearly illustrate the mechanism of such time control mechanism.

Referring now to the drawings in detail, it will be seen that there is illustrated the time control mechanism which is the subject of this invention, the time control mechanism being referred to in general by the reference numeral 10. The time control mechanism 10 includes a housing which is referred to in general by reference numeral 12. The housing 12 includes a supporting base 14 which has projecting outwardly therefrom a hollow body portion 16. The hollow body portion 16 is provided with a removable cover 18. The supporting base 14 is suitably secured to a wall 20 of a building by fasteners 22.

Figure 3:
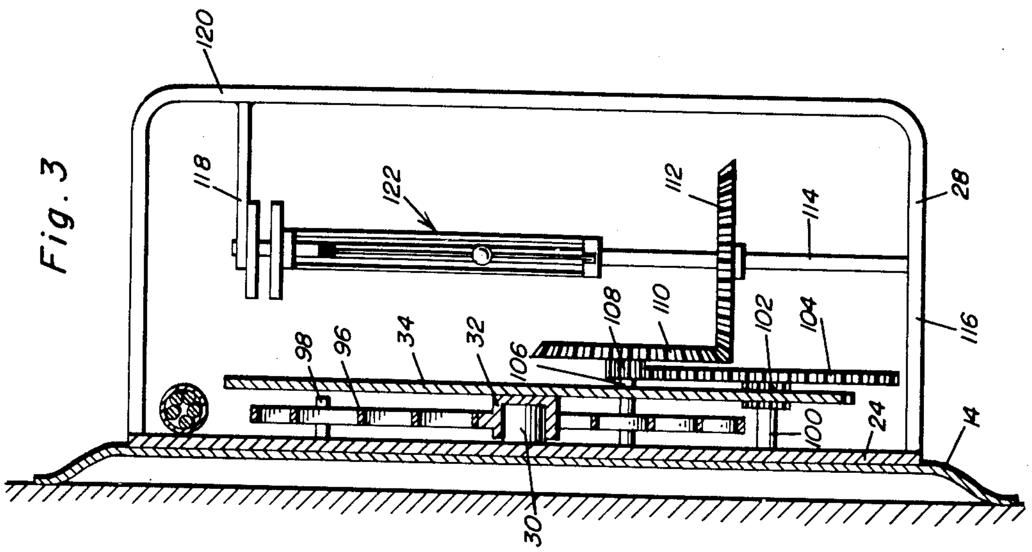
Figure 3 is a sectional view taken substantially upon the plane indicated by the section line 3—3 of Figure 2 and shows the general relationship of means for returning a drive wheel to a starting position, also being illustrated is the relationship of a governor for controlling the speed of rotation of the drive wheel.
Figures 4, 5:
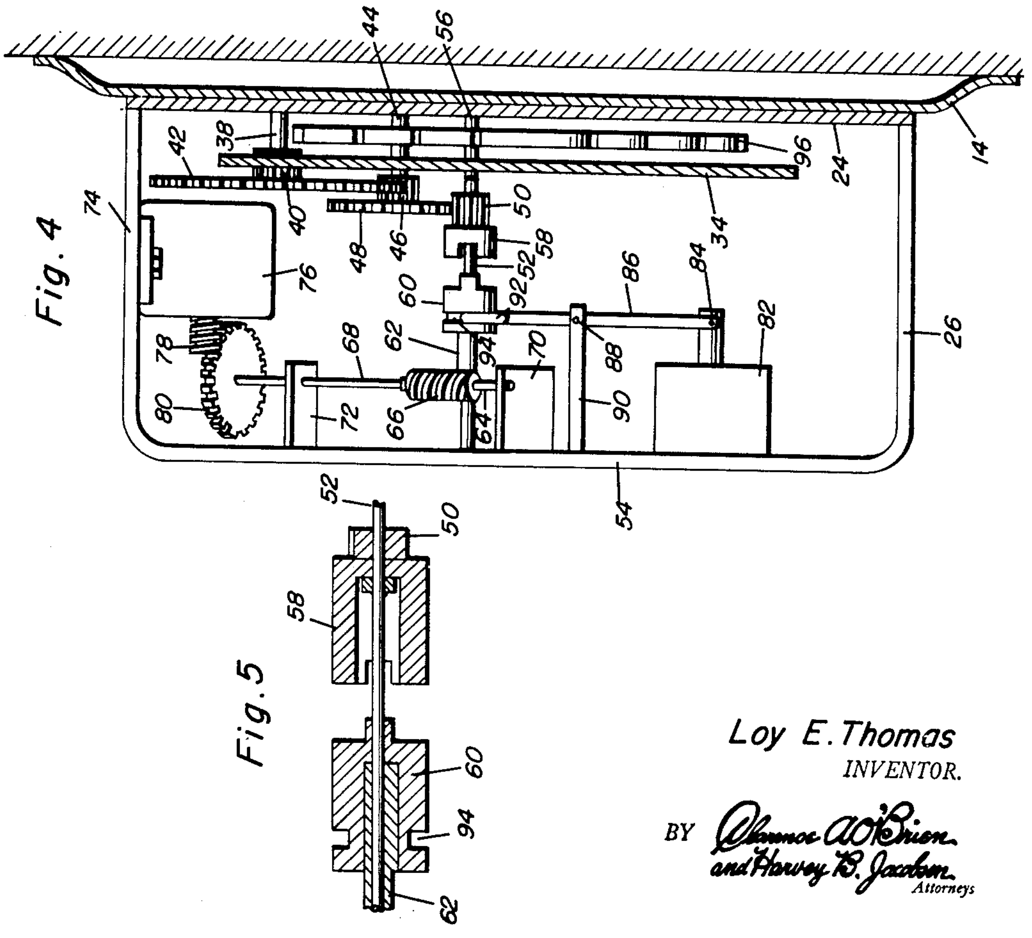
Figure 4 is a sectional view taken substantially upon the plane indicated by the section line 4—4 of Figure 2 and shows the general relationship of means for controlling the driving of the drive wheels.
Figure 5 is an enlarged fragmentary sectional view taken through a clutch mechanism and shows the general construction thereof.

Referring now to Figures 2, 3 and 4 in particular, it will be seen that the supporting base 14 has secured thereto in overlying relation a platform 24. The platform 24 has secured thereto in spaced parallel relation a pair of U-shaped brackets 26 and 28 which have their ends secured to the platform 24.

The platform 24 is provided with a centrally located spindle 30 on which is rotatably mounted a collar 32. The collar 32 is secured to one side of a drive wheel 34 whose periphery is provided with an integral gear 36. Disposed adjacent the drive wheel 34 and the bracket 26 is a second spindle 38 carried by the platform 24, the spindle 38 being in spaced parallel relation with respect to the spindle 30. Rotatably carried by the spindle 38 is a pinion gear 40 which is engaged with the peripheral gear 36. Formed integrally with the pinion gear 40 is a relatively large gear 42.

Disposed adjacent the spindle 38 is a spindle 44. The spindle 44 has rotatably mounted thereon a pinion gear 46. The pinion gear 46 is intermeshed with the gear 42. Formed integrally with the pinion gear 46 for rotation therewith is a gear 48. The gear 48 is in turn intermeshed with a pinion gear 50 which is mounted on a shaft 52 which extends between the bight portion 54 of the bracket 26 and the platform 24. It will be noted that the shaft 52 is provided with an off-set end portion 56 so as to provide clearance for the drive wheel 34 which the pinion gear 50 is partially in alignment with.

Formed integrally with the pinion gear 50 is a female half 58 of a clutch. The female half of the clutch is selectively engageable with a male half 60 which is also mounted on the shaft 52. The male half 60 of the clutch is suitably keyed on a sleeve 62 rotatably carried by the shaft 52 for sliding movement toward and away from the female half 58.

Carried by the opposite end of the sleeve 62 is a gear 64. The gear 64 is intermeshed with a worm gear 66. The worm gear is mounted for rotation on a shaft 68. It will be noted that the end of the shaft 68 adjacent the worm gear 66 is journaled in a bracket 70 which is arcuate in outline and which is carried by the bight portion 54 of the bracket 26. The shaft 68 is also journaled intermediate its ends in a bracket 72 which is also carried by a bight portion 54.

Carried by a leg 74 of the bracket 26 is an electric motor 76. The electric motor 76 is provided with a drive worm gear 78 which is intermeshed with a gear 80. The gear 80 is mounted on the end of the shaft 68 opposite the worm gear 66 for driving the shaft 68.

Carried by the bight portion 54 of the mounting bracket 26 is a solenoid or other type of electromagnetic device 82 which includes a retractible plunger 84. The plunger 84 has connected thereto for pivotal movement an arm 86. The arm 86 is pivoted intermediate its ends by a pivot pin 88 carried by a bracket 90 which is secured to the bight portion 54. The other end of the arm 86 is in the form of a yoke 92 which is received in an annular groove 94 in the male half 60 of the clutch. It will be seen that when the plunger 84 is retracted to the left, as illustrated in Figure 4, the yoke 92 will move to the right to cause engagement of the male half 60 with the female half 58 whereby the rotation of the sleeve 62 by the gear 64 will result in rotation of the pinion gear 50 to cause driving of the drive wheel 34.

Referring now to Figures 2 and 3 in particular, it will be seen that carried by the collar 32 and surrounding the same is a spring motor 96. The spring motor 96 has one end thereof secured to the collar 32 and the other end thereof connected to a pin 98 carried by the platform in the position best illustrated in Figure 2.

Carried by the platform 24 adjacent both the drive wheel 34 and the mounting bracket 28 is a spindle 100 which has rotatably mounted thereon a pinion gear 102 which is engaged with the gear 36 of the drive wheel 34. Formed integrally with the pinion gear 102 for rotation therewith is a gear 104.

Also carried by the platform 24 adjacent both the drive wheel 34 and the mounting bracket 28 is a spindle 106. The spindle 106 is generally V-shaped in outline so that a portion thereof may overlie the drive wheel 34. Rotatably carried by a free end of the spindle 106 remote from the platform 24 is a pinion gear 108 which is intermeshed with the gear 104. Formed integrally with the pinion gear 108 for rotation therewith is a bevel gear 110. The bevel gear 110 is intermeshed with a bevel gear 112.

The bevel gear 112 is mounted for rotation with a shaft 114. The shaft 114 has one end thereof rotatably journaled in a leg 116 of the mounting bracket 28. The other end of the shaft 114 is suitably rotatably journaled in a bracket 118 carried by a bight portion 120 of the mounting bracket 28. Mounted on the shaft 114 for rotation therewith is a governor 122. The governor 122 is of the conventional swinging weight type and need not be explained in more detail.

Figure 6:
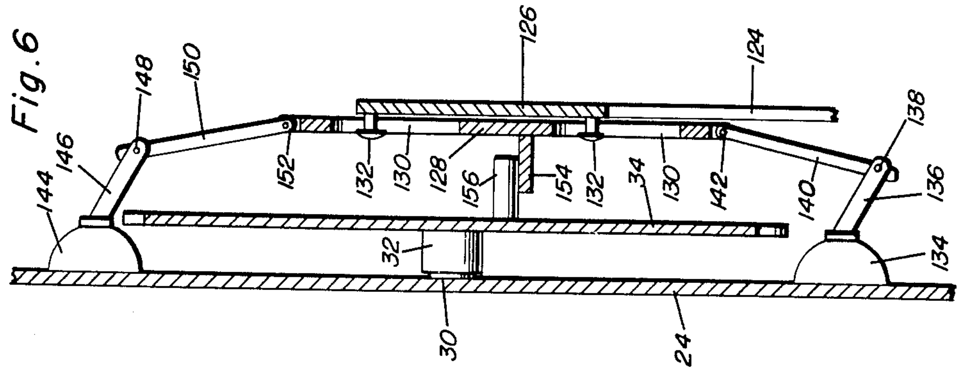
Figure 6 is an enlarged fragmentary sectional view showing the arrangement of control switches and the means for actuating the same in response to rotation of the drive wheels, the driving mechanisms being omitted for purposes of clarity.

Referring now to Figures 2 and 6 in particular, it will be seen that carried by the platform 24 intermediate the mounting brackets 26 and 28 is a U-shaped mounting bracket 124. The U-shaped mounting bracket 124 has formed integrally with the bight portion thereof a diagonal portion 126. Connected to the diagonal portion 126 for sliding motion with respect thereto is an actuator bar 128. The actuator bar 128 is provided with a pair of elongated slots 130 in which are slidably received pins 132 carried by the diagonal portion 126.

Carried by the platform 24 and projecting upwardly therefrom in alignment with the mounting bracket 26 is a toggle switch 134. The toggle switch 134 includes an actuating lever 136. Pivotally connected to the actuating lever 136 by a pivot pin 138 is an actuating arm 140. The other end of the actuating arm 140 is pivotally connected by a pivot pin 142 to an associated end of the actuator bar 128.

Also carried by the platform 134 in longitudinal alignment with the actuator bar 128 and adjacent the mounting bracket 28 is a toggle switch 144. The toggle switch 144 includes an actuating lever 146. Pivotally connected to the upper end of the actuating lever 146 by a pivot pin 148 is an actuating arm 150. The other end of the actuating arm 150 is pivotally connected to an associated end of the actuator bar 128 by a pivot pin 52.

The actuator bar 128 has carried thereby a lug 154 which is directed toward the drive wheel 34. The lug 154 is selectively engaged by a pin 156 carried by the drive wheel 34 in eccentric relation.

Figure 7:
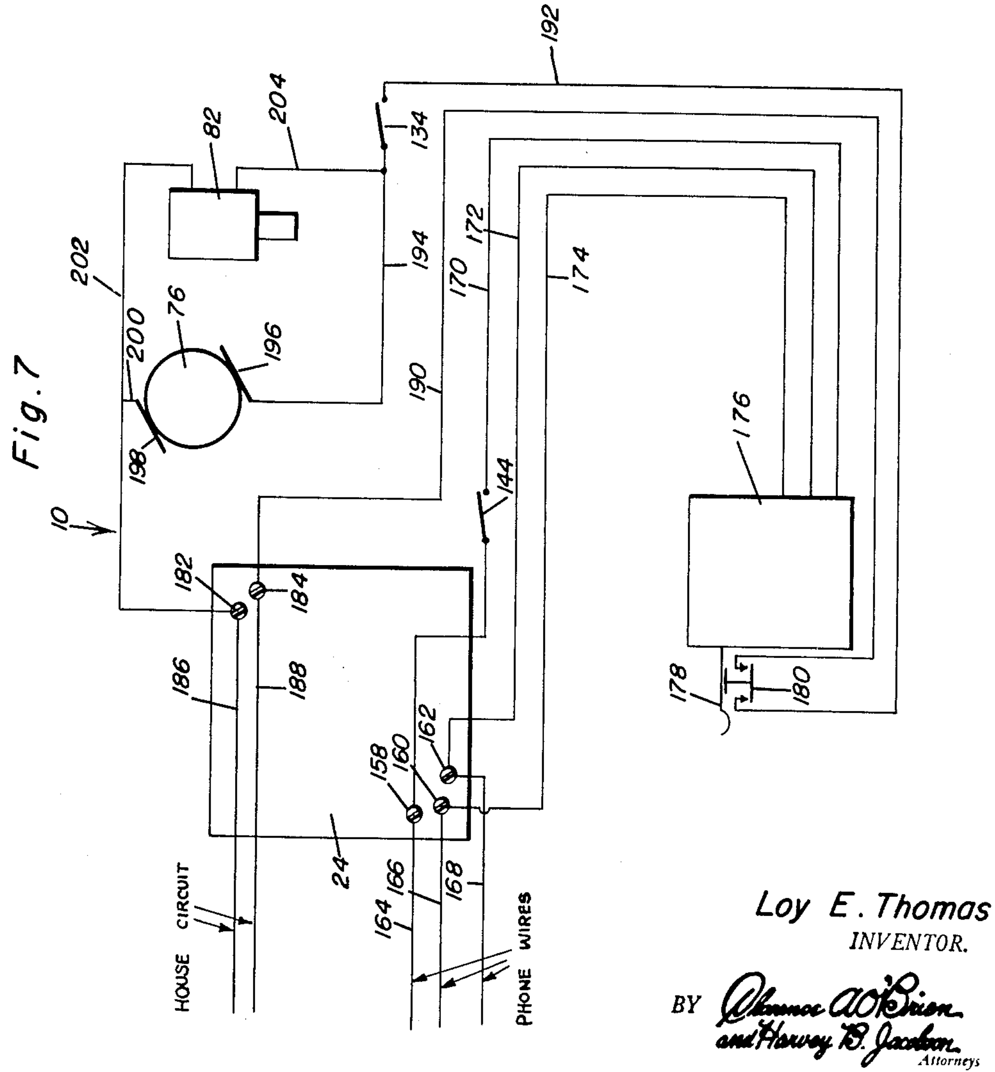
Figure 7 is a wiring diagram for a telephone having incorporated in its circuit the time control mechanism.

Referring now to Figure 7 in particular, it will be seen that there is illustrated the wiring diagram for a telephone in whose circuit there is incorporated the time control mechanism 10. The time control mechanism 10 has the platform 24 thereof provided with terminals 158, 160 and 162 to which are connected lead-in wires 164, 166 and 168, respectively, which are conventional telephone lead-in wires. Also connected to the terminals 158, 160 and 162 are telephone wires 170, 172 and 174, respectively. The wires 170, 172 and 174 are connected to a conventional telephone set 176 in the conventional manner. However, the wire 170 is provided with the toggle switch 144.

The telephone set 176 includes a conventional hand set hook 178. Associated with the hand set hook 178 is a switch 180. The switch 180 is of a nature whereby when the hand set (not shown) is positioned on the hand set hook 178, the switch 180 is in an open position. However, when the hand set is removed from the hand set hook 178, the hook automatically moves upwardly to close the switch 180.

The platform 24 is provided with a pair of terminals 182 and 184 to which are connected lead-in wires 186 and 188, respectively, of a house circuit. Connected to the terminal 184 is a wire 190 whose opposite end is connected to a terminal of the switch 180. Connected to an opposite terminal of the switch 180 is a wire 192 whose opposite end is connected to the toggle switch 134. Connected to the toggle switch 134 on the side thereof opposite from the wire 192 is a wire 194. The wire 194 is connected to a first brush 196 of the electric motor 76. Connected to the other brush 198 of the electric motor 76 is a wire 200. The wire 200 is connected to a wire 202 which is connected to a terminal 182. The wire 202 is also connected to one terminal of the solenoid 82. Connecting a second terminal of the solenoid 82 to the switch 134 is a wire 204.

It will be understood that the time control mechanism 10 will be secured to the outside of one's house and that the wires 170, 172, 174, 190 and 192 will lead into the house in the conventional manner. If desired, the cover 118 which is removably secured to the mounting brackets 26 and 28 by fasteners 206 and 208, respectively, may be sealed with respect to the remainder of the house 12 to prevent tampering with the mechanism therein.

In operation, when the hand set is removed from the hand set hook 178, the switch 180 is closed which results in the energization of both the electric motor 76 and the solenoid 82 inasmuch as the toggle switch 134 is also initially closed. This causes rotation of the drive wheel 34. As the drive wheel 34 rotates, the pin 156 moves toward the lug 154 and becomes in engagement therewith. Further rotation of the drive wheel 34 results in the sliding of the actuator bar 128 with respect to the diagonal portion 126 of the mounting bracket 124. As rotation of the drive wheel 34 continues, the movement of the actuator bar 128 causes the tripping of both the toggle switch 134 and the toggle switch 144. The tripping of the toggle switches 134 and 144 results in the opening of the toggle switch 134 simultaneous with the opening of the toggle switch 144.

When the toggle switch 144 is open, the telephone circuit of the telephone 176 is also opened thereby causing the telephone to go dead thereby automatically cutting off the user of the particular telephone 176 so that other subscribers on the party line may then be free to utilize the party line.

After the switch 134 has opened and the solenoid 82 and the electric motor 76 deenergized, the spring 96 which was wound due to the rotation of the drive wheel 34 by the electric motor 76 is now free to rotate the drive wheel 34 in the opposite direction. The drive wheel 34 rotates a complete revolution until such time as the pin 156 engages the opposite side of the lug 154 from the position illustrated in Figure 6. The actuator bar 128 is then moved in a direction opposite from that described above to again trip the toggle switches 134 and 144. The tripping of the toggle switches 134 and 144 at this time causes the toggle switch 144 to close simultaneous with the closing of toggle switch 134. Then the user of the telephone 176 may make or receive another call.

It has been found that the preferred time limit, which may be controlled through the speed of the electric motor 76, is a five minute talking period, which is the time required to rotate the drive wheel 34 the desired distance by the electric motor 76. It has also been determined that the desired waiting period is three minutes which is the time required by the spring motor 96, as controlled by the governor 122, to rotate the drive wheel 34 back to its starting position.

From the foregoing, the construction and operation of the device will be readily understood and further explanation is believed to be unnecesary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A time controller comprising a switch, first means for moving said switch to an open position, second means for moving said switch to a closed position, said first and second means including a common drive wheel having an eccentric drive pin, said drive pin being engaged with an actuator for said switch, said actuator including a slotted member restrained to linear movement, a switch lever, and a link pivotally connected to said lever and pivotally connected to said slotted member, said first means including a drive motor drivingly connected to said drive wheel for driving said drive wheel in a first direction, said second means including a spring motor for driving said drive wheel in the opposite direction to said first direction, said spring motor being energized in response to rotation of said drive wheel by said drive motor, a governor operatively connected to said drive wheel for controlling the speed of rotation thereof.

2. A time controller comprising a first switch circuit, first means for moving said first switch to an open position, second means for moving said first switch to a closed position, said first and second means including a common drive wheel having an eccentric drive pin, said drive pin being engaged with an actuator for said first switch, said actuator including a slotted member restrained to linear movement, a switch lever, and a link pivotally connected to said lever and pivotally connected to said slotted member, said first means including a drive motor drivingly connected to said drive wheel for driving said drive wheel in a first direction, said second means including a spring motor for driving said drive wheel in the opposite direction to said first direction, said spring motor being energized in response to rotation of said drive wheel by said drive motor, a clutch disposed between said drive motor and said drive means, said drive motor and said clutch having common control means, said common control means including a second switch operated simultaneously with the operation of the first mentioned switch, a solenoid controlling the position of said clutch, said second switch energizing and deenergizing said solenoid, and a linkage connecting said slotted member to said second switch.

References Cited in the file of this patent

UNITED STATES PATENTS

| | | |
|---|---|---|
| 2,053,143 | Frederick | Sept. 1, 1936 |
| 2,055,707 | Rippl | Sept. 29, 1936 |
| 2,202,149 | Gottlieb | May 28, 1940 |
| 2,312,077 | Cowles | Feb. 23, 1943 |
| 2,317,120 | Tamburr et al. | Apr. 20, 1943 |
| 2,388,686 | Habig | Nov. 13, 1945 |
| 2,536,741 | Haigh | Jan. 2, 1951 |
| 2,599,858 | Noon | June 10, 1952 |
| 2,644,518 | Hertrich | July 7, 1953 |